(12) United States Patent
Kimura et al.

(10) Patent No.: US 6,965,632 B2
(45) Date of Patent: Nov. 15, 2005

(54) METHOD AND APPARATUS FOR USING ADAPTIVE THRESHOLD WITH INITIAL ACQUISITION

(75) Inventors: Koji Kimura, San Diego, CA (US); Joseph Chan, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 799 days.

(21) Appl. No.: 09/877,993

(22) Filed: Jun. 8, 2001

(65) Prior Publication Data

US 2002/0186751 A1 Dec. 12, 2002

(51) Int. Cl.⁷ .............................. H04B 1/69; H03D 1/00; H04J 11/00
(52) U.S. Cl. ..................... 375/142; 375/150; 375/343; 370/210
(58) Field of Search .................. 375/343, 142, 375/150, 130, 145, 367; 370/210, 342

(56) References Cited

U.S. PATENT DOCUMENTS

| | | | | |
|---|---|---|---|---|
| 5,016,261 A | * | 5/1991 | Amoroso et al. | 375/317 |
| 5,553,081 A | * | 9/1996 | Downey et al. | 714/709 |
| 5,642,377 A | * | 6/1997 | Chung et al. | 375/145 |
| 6,363,049 B1 | * | 3/2002 | Chung | 370/210 |
| 6,763,056 B1 | * | 7/2004 | Ohsuge | 375/140 |
| 6,798,758 B1 | * | 9/2004 | Chun et al. | 370/335 |

OTHER PUBLICATIONS

Triska et al., Multiple Dwell Serial Search: Performance and Application to Direct Sequence Code Acquisition, Communications, IEEE Transactions on [legacy, pre—1988], vol.: 31 , Issue: 5 , May 1983, pp:650–659.*

* cited by examiner

*Primary Examiner*—Amanda T. Le
*Assistant Examiner*—Cicely Ware
(74) *Attorney, Agent, or Firm*—Blakely, Sokoloff, Taylor & Zafman LLP

(57) ABSTRACT

A method and apparatus for initial acquisition using an adaptive threshold includes performing a sort operation of a plurality of full-length correlator outputs and updating the adaptive threshold. Partial-length correlator outputs are generated and compared with an adaptive threshold. If a partial-length correlator output for a particular PN sequence timing is greater than or equal to the adaptive threshold, a full-length correlator output for that PN sequence timing is generated. A sort operation of a plurality of full-length correlator outputs is performed, and sort results are used to update the adaptive threshold. If a partial-length correlator output for a particular PN sequence timing is less than the adaptive threshold, a full-length correlator output for that PN sequence timing is not generated.

31 Claims, 3 Drawing Sheets

METHOD AND APPARATUS FOR USING ADAPTIVE THRESHOLD WITH INITIAL ACQUISITION

BACKGROUND OF THE INVENTION

Field of the Invention

This invention relates generally to spread-spectrum cellular communications, and more particularly to an adaptive threshold for the searcher for a spread-spectrum cellular system.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000, Sony Electronics Inc., All Rights Reserved.

BACKGROUND

Wireless communications systems that employ spread spectrum technology, such as code division multiple access (CDMA) systems, transmit multiple calls within a single cell over a single carrier. CDMA systems use codes, rather than allocated times or frequencies, to distinguish between calls. A Walsh code is used to distinguish one call from other calls transmitted from the same base station over the single carrier. Pseudo-noise (PN) sequences are used to distinguish one base station from other base stations. Mobile stations must synchronize with a base station in order to filter a desired voice signal from the signal transmitted from the base station.

A base station encodes a call by modulating a digitized voice signal with a Walsh code and with in-phase pseudo-noise (I-PN) and quadrature-phase pseudo-noise (Q-PN) sequences. The base station then modulates the coded signal with a carrier at the appropriate frequency, typically either 800 MHz or 1.9 GHz, and broadcasts the modulated signal. Typically the carrier frequency has a range either between 869.040 and 893.970 MHz, or between 1930.00 and 1989.950 MHz. These ranges vary depending upon the country in which the CDMA system is being implemented. Linear feedback shift registers (LFSRs) in the base station generate the I-PN and Q-PN sequences. Because all base stations use the same LFSRs, they all generate the same PN sequences. However, the phase of the PN sequences varies from one base station to the next. Phases of PN sequences generated by separate base stations vary by increments of 64 chips, where a chip corresponds to one bit of data in a PN sequence. Since there are 32,768 chips in a PN sequence, there are 512 (32,768 divided by 64) possible phases for the base stations.

To receive a call, the mobile station must multiply the coded signal received from the base station with the correct Walsh code and PN sequences to filter out the desired voice signal. The mobile station must generate the same PN sequences as those generated by the base station. Furthermore, the phase of the PN sequences generated by the mobile station must match the phase of the PN sequences generated by the base station. The mobile station generates the correct PN sequences by using the same LFSRs as those in the base station. The mobile station synchronizes with the base station by varying the timing of the PN sequences generated by its PN sequence generator and comparing each PN sequence timing with a pilot signal received from the base station.

All base stations continuously transmit a pilot signal used by mobile stations to perform synchronization. The pilot signal comprises code channel zero modulated with I-PN and Q-PN sequences. Code channel zero refers to the Walsh code comprising all zero data. Therefore, the pilot channel consists of only the I-PN and Q-PN sequences. After a mobile station synchronizes with a base station by matching the phase of its PN sequence generator with that of the base station, the mobile station can receive calls from that base station.

A mobile station performs synchronization by searching all 32,768 possible PN sequence timings to determine the timing that matches the pilot signal. There are several algorithms used to perform this search. One algorithm is a single dwell search, in which a correlator in the mobile station calculates, for a predetermined number of chips per PN sequence timing, the correlation between the received pilot signal and the PN sequences generated by the mobile station. Typically, the number of chips compared per PN sequence timing is 1024 chips. Therefore, for each PN sequence timing, the correlator calculates the correlation between the received pilot signal the PN sequences generated by the mobile station for 1024 chips and then moves on to the next timing. After calculating the correlation for the entire PN space, which includes 32,768 possible PN sequence timings, a sorter determines the timing with the highest correlator output. This timing corresponds to the timing of the PN sequence generators in the base station.

Another algorithm is a multiple dwell search, in which the correlator first calculates, for a reduced number of chips per PN sequence timing, the correlation between the received pilot signal and the PN sequences generated by the mobile station. A comparator in the mobile station compares the correlator output with a threshold. If the correlator output is greater than or equal to the threshold, the correlator calculates the correlation for the full number of chips for that PN sequence timing and passes the output along to the sorter. If the correlator output is less than the threshold, the correlator output is not passed on to the sorter and the correlator moves on to the next PN sequence timing. Typically, the reduced number of chips equals half (50%) of the full number of chips used to perform the correlation for the PN sequence timings. Thus, if the full number of chips is 1024, the reduced number of chips is 512. After the correlator calculates outputs for the entire PN space, the sorter determines the timing with the highest correlation output. Again, this timing corresponds to the timing of the PN sequence generators in the base station.

A multiple dwell search reduces the total amount of processing time required to calculate the correlation between the received pilot signal and the PN sequences generated by the mobile station by almost one half. Furthermore, the amount of processing time required to sort the PN sequence timings is significantly reduced. However, there are problems associated with a multiple dwell search relating to use of a threshold. If the threshold is set too high, none of the half-length correlation outputs may be above the threshold, in which case the sorter will not receive data for any PN sequence timings. Alternatively, if the threshold is set too low, most or all of the half-length correlation outputs may be above the threshold, in which case the total processing time is reduced only slightly or not at all.

DETAILED DESCRIPTION

In the following detailed description, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The present invention provides a method and apparatus for an adaptive threshold used in an initial acquisition searcher for a spread spectrum system such as a cellular system. Although the present invention is described in the context of a cellular system, the invention is not limited as such. The adaptive threshold may be used to perform a multiple dwell search of a pseudo-noise (PN) space. In one embodiment, partial-length correlator outputs corresponding to varying timings of in-phase pseudo-noise (I-PN) and quadrature-phase pseudo-noise (Q-PN) sequences generated by a mobile station (e.g. cell phone) are calculated. If the partial-length correlator output for a particular timing is greater than or equal to the adaptive threshold, a full-length correlator output for that timing is determined. The adaptive threshold is modified and the full-length correlator output along with its corresponding timing are stored. If the partial-length correlation output is less than the adaptive threshold, the next timing is examined without calculating the full-length correlation output, and without storing a correlator output for that timing. After the correlator outputs are calculated for the entire PN space, the stored timings are sorted and the timing corresponding to the greatest full-length correlator output is selected.

Figure 1:
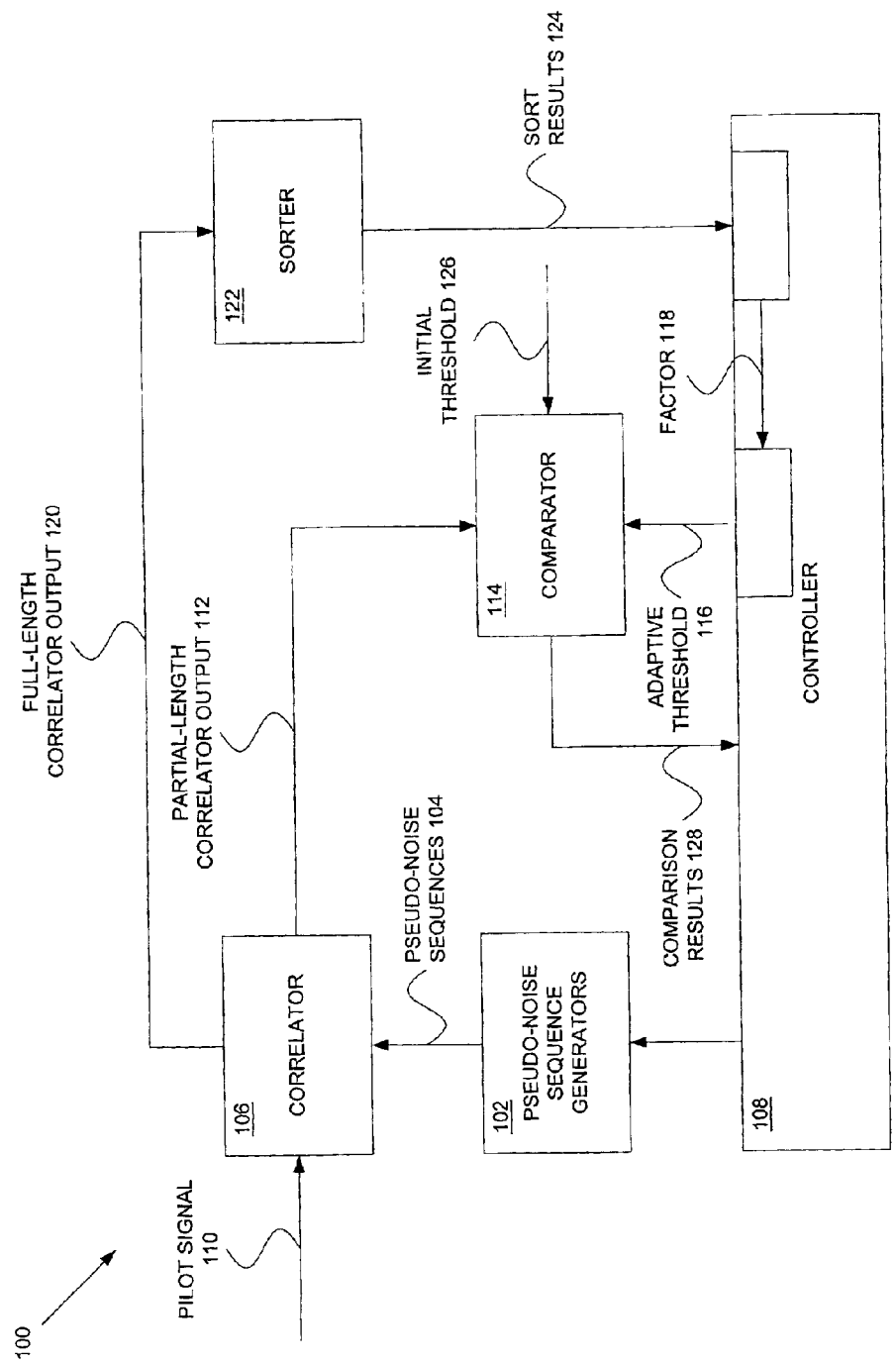
FIG. 1 is a block diagram illustrating an initial acquisition for a spread-spectrum cellular system using an adaptive threshold according to one embodiment of the present invention.

A system level overview of an initial acquisition searcher 100 according to one embodiment of the present invention is described by reference to FIG. 1. A PN sequence generator 102 generates I-PN and Q-PN sequences 104 and provides the PN sequences 104 to a correlator 106. The PN sequence generator 102 may use linear feedback shift registers (LFSRs) to generate the PN sequences 104. The PN sequences 104 generated by the LFSRs are noise-like in their characteristics, but they are also deterministic and can be reproduced by using the same LFSRs. Typically, the PN sequences 104 have a total length of 32,768 chips, where a chip refers to a single data bit in the PN sequence 104. Consequently, there are 32,768 different possible timings of the PN sequences 104. The possible PN sequence timings are referred to herein as PN 0 through PN 32,767. The initial acquisition searcher 100 typically must search all 32,768 possible PN sequence timings to synchronize with the base station.

A controller 108, in addition to having other functions described below, controls the timing of the PN sequences 104 generated by the PN sequence generator 102. The controller 108 may cause the PN sequence generator 102 to generate all possible PN sequence timings from PN 0 to PN 32,767. According to one embodiment, the controller 108 causes the PN sequence generator 102 to generate PN sequence timings for a certain number of chips, referred to herein as the partial correlation length. The controller 108 may also cause the PN sequence generator 102 to generate some PN sequence timings for some increased number of chips, referred to herein as the full correlation length. Typically, the full correlation length is equal to 1024 chips because this length provides a satisfactory signal-to-noise (S/N) ratio to ensure proper synchronization. Furthermore, the partial correlation length typically is 50% of the value of the full correlation length. Therefore, if the full correlation length is 1024 chips, the partial correlation length typically is 512 chips. However, it is to be appreciated that other values for the full correlation length and the partial correlation length can be used. When the PN sequence generator 102 has generated a particular timing of the PN sequence 104 for the appropriate correlation length, the controller 108 causes the PN sequence generator 102 to stop generating that PN sequence timing and begin generating the next PN sequence timing.

The correlator 106 receives both the PN sequences 104 generated by the PN sequence generator 102 in the mobile station of a cellular system and a pilot signal 110 that is transmitted from a base station. The base station transmits a pilot channel comprising code channel zero modulated with I-PN and Q-PN sequences. Code channel zero refers to a Walsh code comprising all zero data. Linear feedback shift registers (LFSRs) in the base station generate the pseudo-noise sequences with which the pilot channel is modulated. The mobile station 100 converts the pilot signal 110 down to baseband before the correlator 106 receives it.

The pilot signal 110 is modulated with the same PN sequences that are generated by the PN sequence generator 102 in the mobile station. This is because the PN sequence generators in both the base station and the mobile station use the same LFSRs. However, the mobile station at its initialization state typically is not synchronized with the base station. In other words, the timing of the PN sequences generated by the mobile station immediately after power up typically is not in phase with the timing of the PN sequences in the pilot signal 110. To demodulate the voice data signal, the mobile station 100 must synchronize the timing of its PN sequence generators 102 with the timing of the PN sequence generators in the base station.

According to one embodiment of the present invention, the correlator 106 calculates a partial-length correlator output 112 for each PN sequence timing and provides the partial-length correlator output 112 to a comparator 114. The partial-length correlator output 112 is determined by multiplying the pilot signal 110 by a particular timing of the pseudo-noise sequences 104 for the partial correlation length. According to one embodiment of the present invention, the partial correlation length is one-half (50%) of the full correlation length. The comparator 114 compares the partial-length correlator output 112 to an adaptive threshold 124 and provides comparison results 116 to the controller 108.

According to one embodiment of the present invention, if the partial-length correlator output 112 is greater than or equal to the adaptive threshold 116, the controller causes the pseudo-noise sequence generator 102 to continue generating that timing of the pseudo-noise sequence 104 for the full correlation length. If the partial length correlator output 112 is less than the adaptive threshold, the controller causes the PN sequence generator 102 to discontinue generating that PN sequence timing and to begin generating the next PN sequence timing. Typically, the full correlation length is 1024 chips, and therefore the partial correlation length typically is 512 chips. However, other values for the full correlation and partial correlation lengths may be used.

A sorter 122 receives a full-length correlator output 120 corresponding to a PN sequence timing that produces a partial-length correlator output 112 greater than or equal to the adaptive threshold 116. According to one embodiment of the present invention, the sorter 122 stores all of the timings and their corresponding full-length correlator outputs 120 that produce a partial-length correlator output 112 greater than or equal to the adaptive threshold 116. According to another embodiment, the sorter 122 stores up to a maximum number of PN sequence timings and their corresponding full-length correlator outputs 120. The product of the PN sequences 104 and the pilot signal 110 has a maximum value when their phases are synchronized. Therefore, the sorter 122 selects the timing corresponding to the greatest full-length correlator output 120.

According to one embodiment of the present invention, the 122 sorter provides sort results 124 to the control 108, which uses the sort results 124 to modify the adaptive threshold 116. According to one embodiment of the present invention, the controller 108 modifies the adaptive threshold 116 by multiplying one of the full-length correlator outputs 120 stored in the sorter 122 by a predetermined factor 118, Typically, the value of the factor 118 is between zero and one. For example, the controller 108 can multiply the smallest full-length correlator output 120 by a factor 118 equal to 0.4. However, other methods of modifying the adaptive threshold 116 will be apparent to those of skill in the art, and are within the scope of the present invention.

The initial acquisition system 100 may have an initial threshold 126. The system 100 compares the initial threshold 126 with partial-length correlator outputs 112 until the system 100 has the opportunity to calculate the adaptive threshold 116. According to one embodiment of the invention, the initial threshold 126 equals zero. In this embodiment, the initial threshold 126 is compared only with the partial-length correlator output 112 corresponding to PN 0 because the initial threshold 126 will necessarily be less than the partial-length correlator output 112. The system 100 then calculates a full-length correlator output 120 for PN 0 and multiplies the full-length correlator output 120 by the factor 118 to determine the adaptive threshold 116.

According to another embodiment, the initial threshold 126 equals a number calculated from a previous initial acquisition search. For example, the initial threshold 126 can equal the last adaptive threshold 116 calculated in the previous search. In this embodiment, the initial acquisition system 100 compares the initial threshold 126 with partial-length correlator outputs 112 until a partial-length correlator output 112 for a particular timing is greater than the initial threshold 126. Then, the system 100 calculates an adaptive threshold 116 that is compared with the partial-length correlator output 112 for the subsequent timing. Alternative methods can be used to calculate the initial threshold 126 and fall within the scope of the present invention.

Figure 2:
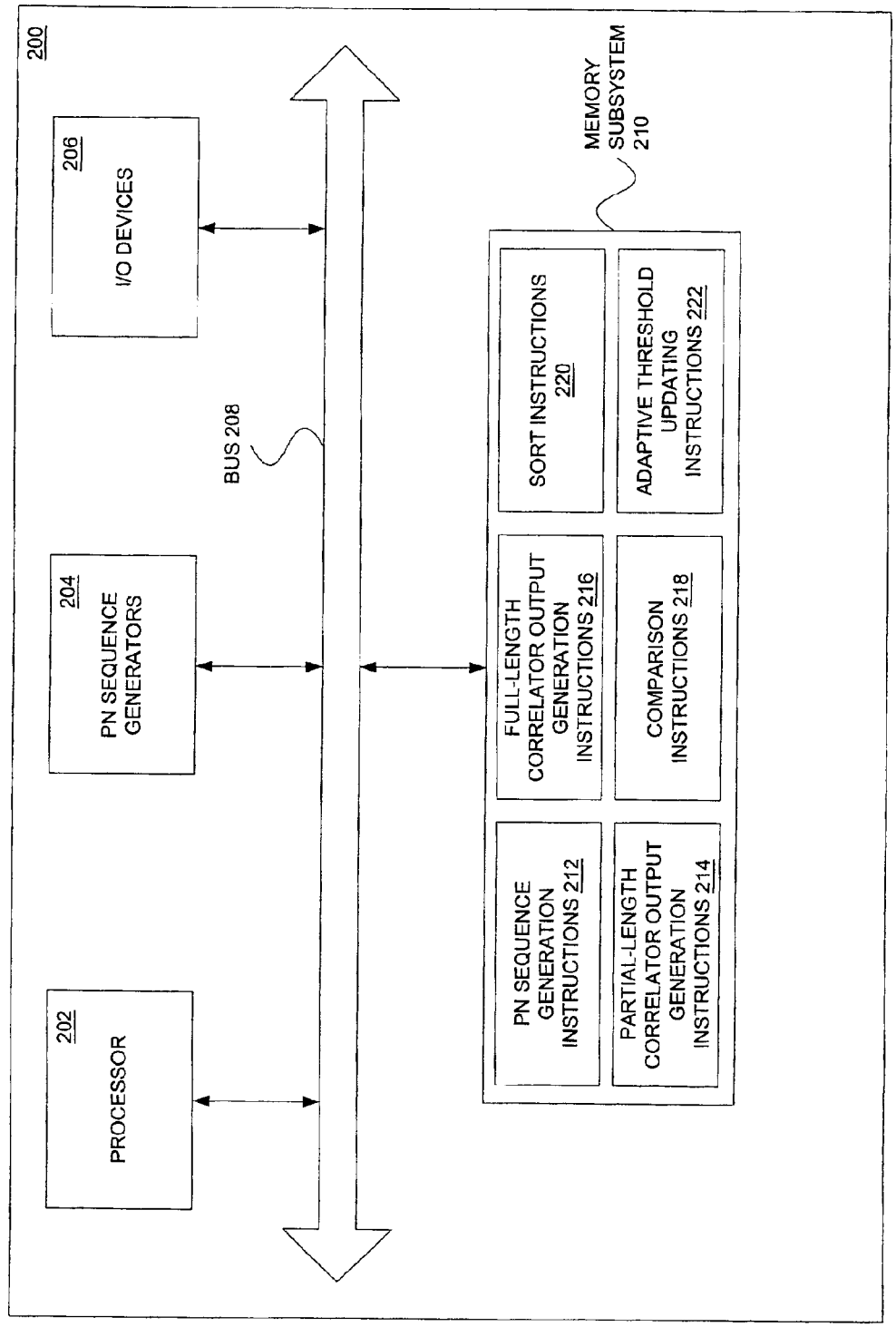
FIG. 2 is a flow diagram illustrating the process of initial acquisition using an adaptive threshold according to one embodiment of the present invention.

A block diagram illustrating an implementation of an initial acquisition system using an adaptive threshold as a series of software routines executed by a hardware system 200 is described by reference to FIG. 2. These software routines comprise a plurality or series of instructions to be executed by a processor in a hardware system, such as processor 202 of FIG. 2. Initially, the series of instructions are stored on a storage device of memory subsystem 210. It is to be appreciated that the series of instructions can be stored using any conventional storage medium, such as EEPROM, flash memory, a diskette, CD-ROM, magnetic tape, DVD, ROM, etc. It is also to be appreciated that the series of instructions need not be stored locally, and could be received from a remote storage device, such as a server on a network, via a network/communication interface. The instructions are copied from the storage device, such as mass storage, into system memory and then accessed and executed by processor 202. In one implementation, these software routines are written in the C++ programming language. It is to be appreciated, however, that these routines may be implemented in any of a wide variety of programming languages.

These software routines are illustrated in memory subsystem 210 as PN sequence generation instructions 212, partial-length correlator output generation instructions 214, full-length correlator output generation instructions 216, comparison instructions 218, sort instructions 220, and adaptive threshold updating instructions 222.

In alternate embodiments, the present invention is implemented in discrete hardware or firmware. For example, one or more application specific integrated circuits (ASICs) could be programmed with the functions described above for the present invention. By way of another example, correlator 106, controller 108, comparator 114, and sorter 122 of FIG. 1 could be implemented in one or more ASICs of an additional circuit board for insertion into hardware system 200 of FIG. 2.

In the discussions above, the present invention is described with reference to initial acquisition systems. It is to be appreciated, however, that alternate embodiments of the present invention can be used with other types of search systems, such as multipath search systems and wireless local loop search systems.

Figure 3:
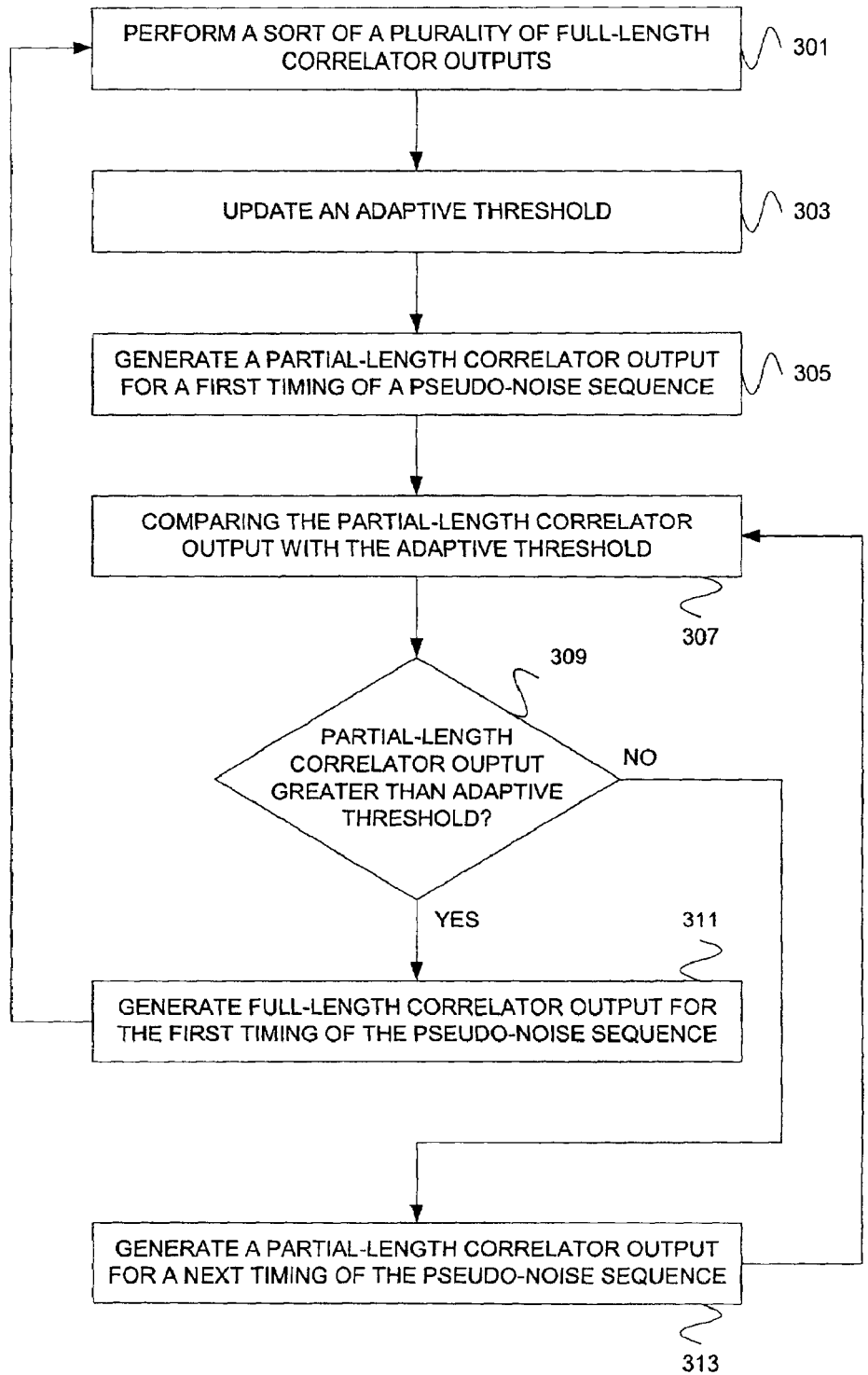
FIG. 3 is a block diagram illustrating a computing device suitable for use with one embodiment of the present invention.

A flow diagram illustrating the process of using an adaptive threshold with an initial acquisition system according to one embodiment of tho present invention is described by reference to FIG. 3. A sort operation of a plurality of full-length correlator outputs (block 301) is performed. The sort operation is performed by arranging full-length correlator outputs and their corresponding timings. Full-length correlator outputs corresponding to distinct timings of I-PN and Q-PN sequences are generated. A full-length correlator output is generated for a particular timing if a partial-length correlator output for that timing is greater than or equal to the adaptive threshold.

According to one implementation, up to a maximum number of full-length correlator outputs are stored. Initially, each full-length correlator output generated is stored until the maximum number of full-length correlator outputs has been stored. Subsequently, a full-length correlator output for a particular timing is stored only if that full-length correlator output is greater than the smallest full-length correlator output already stored. The full-length correlator for that timing is stored, and the smallest full-length correlator output is removed from memory.

After the sort operation is performed, the adaptive threshold (block 303) is updated. When performing a multiple dwell search, partial-length correlator outputs are compared with the adaptive threshold. The value of the adaptive threshold changes throughout the process of performing the multiple dwell search. Therefore, typically the value of the adaptive threshold when compared with a partial-length correlator output for a particular timing is different than when compared with a partial-length correlator output for another timing. In one implementation, results of the sort operation performed in block 301 are used to update the adaptive threshold. According to one embodiment, the sorter provides results of the sort to the controller. In one embodiment, one full-length correlator output is selected from the plurality of full-length correlator outputs and multiplied by a factor. The full-length correlator output selected may be the full-length correlator output having the smallest value. Typically, the factor is a number greater than 0 and less than or equal to 1. A factor of 0.4 is known to work well with the present invention. Alternative methods of using results of the sort operation to update the adaptive threshold will be apparent to those having skill in the art.

A partial-length correlator output is generated (block 305) for a timing that has not previously been searched. According to one implementation, partial-length correlator outputs are sequentially generated for all timings from PN 0 to PN 32,767. Therefore, if partial-length correlator outputs have already been generated for PN 0 through PN 500, a partial-length correlator output for PN 501 is calculated next. According to one implementation, the partial-length correlator output is calculated by multiplying I-PN and Q-PN sequences for a particular timing by a pilot signal for a partial correlation length. Typically, the partial correlation length is half (50%) of a full correlation length. Therefore, if the full correlation length is 1024 chips, the partial correlation length is 512 chips.

Next, the partial-length correlator output is compared with the adaptive threshold (block 307). If the partial-length correlator output for the particular timing is greater than or equal to the adaptive threshold (decision 309), a full-length correlator output for that timing is generated. For example, if the partial-length correlator output corresponding to PN 501 is greater than or equal to the adaptive threshold, a full-length correlator output for PN 501 is generated. Then, the plurality of full-length correlator outputs is sorted again (block 301) and a new value for the adaptive threshold is calculated (block 303).

If the partial-length correlator output for a particular timing is less than the adaptive threshold (decision 309), a partial-length correlator output for the next timing is calculated (block 313). A full-length correlator output for that timing is not calculated. For example, if the partial-length correlator output corresponding to PN 501 is less than the adaptive threshold, a partial-length correlator output corresponding to PN 502 is calculated next. A full-length correlator output for PN 501 is not calculated. Furthermore, the adaptive threshold does not change, so the value of the adaptive threshold when compared with the partial-length correlator output corresponding to PN 501 is the same as when compared with the partial-length correlator output corresponding to PN 502.

Therefore, an initial acquisition system using an adaptive threshold has been described. A pilot signal is multiplied by I-PN and Q-PN sequences for a partial correlation length, typically 512 chips, to generate a partial-length correlator output corresponding to a particular PN sequence timing. The partial-length correlator output is compared with the adaptive threshold. If the partial-length correlator output is greater than or equal to the adaptive threshold, a full-length correlator output corresponding to the same PN sequence timing is generated by multiplying the pilot signal by the I-PN and Q-PN sequences for a full correlation length, typically equal to 1024 chips. A plurality of full-length correlator outputs, corresponding to distinct PN sequence timings, are sorted, and sort results are used to update the adaptive threshold. If the partial-length correlator output is less than the adaptive threshold, a full-length correlator output for that PN sequence timing is not generated, and a partial-length correlator output is generated for the next PN sequence timing.

Thus, a method and apparatus for initial acquisition using an adaptive threshold has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method for using an adaptive threshold with an initial acquisition system comprising:

performing a sort operation of a plurality of full-length correlator outputs;

updating the adaptive threshold; and comparing a partial-length correlator output with the adaptive threshold.

2. The method of claim 1 further comprising using results of the sort operation to update the adaptive threshold.

3. The method of claim 1 wherein updating the adaptive threshold comprises:

selecting a full-length correlator output from the plurality of full-length correlator outputs; and multiplying the full-length correlator output selected from the plurality of full-length correlator outputs by a factor.

4. The method of claim 3 wherein the full-length correlator output selected from the plurality of full-length correlator outputs is the full-length correlator output having the smallest value.

5. The method of claim 3 wherein the factor is a number greater than zero and less than one.

6. The method of claim 3 wherein the factor equals 0.4.

7. The method of claim 1 further comprising calculating the plurality of full-length correlator outputs.

8. The method of claim 7 wherein calculating the plurality of full-length correlator outputs comprises multiplying varying timings of a first pseudo-noise sequence and a second pseudo-noise sequence by a pilot signal for a full correlation length.

9. The method of claim 8 wherein the full correlation length equals 1024 chips.

10. The method of claim 8 further comprising receiving the pilot signal.

11. The method of claim 8 wherein:

the first pseudo-noise sequence is an in-phase pseudo-noise sequence; and the second pseudo-noise sequence is a quadrature-phase pseudo-noise sequence.

12. The method of claim 8 further comprising generating the first pseudo-noise sequence and the second pseudo-noise sequence.

13. The method of claim 1 further comprising storing the plurality of full-length correlator outputs.

14. The method of claim 1 further comprising generating the partial-length correlator output.

15. The method of claim 14 wherein generating the partial-length correlator output comprises multiplying varying timings of a first pseudo-noise sequence and a second pseudo-noise sequence by a pilot signal for a partial correlation length.

16. The method of claim 15 wherein the partial correlation length is equal to half of a full correlation length.

17. The method of claim 16 wherein:

the partial correlation length equals 512 chips; and the full correlation length equals 1024 chips.

18. An initial acquisition system using an adaptive threshold comprising:

a sorter to perform a sort operation of a plurality of full-length correlator outputs; and a controller coupled with the sorter to update the adaptive threshold; and a comparator coupled with the controller to compare the adaptive threshold with a partial-length correlator output.

19. The system of claim 18 wherein the sorter stores the plurality of full-length correlator outputs.

20. The system of claim 18 wherein the sorter provides results of the sort operation of the plurality of full-length correlator outputs to the controller.

21. The system of claim 18 wherein the controller provides the adaptive threshold to the comparator.

22. The system of claim 18 further comprising a correlator coupled with the sorter and with the comparator to generate the plurality of full-length correlator outputs and provide the plurality of full-length correlator outputs to the sorter, and to generate the partial-length correlator output and provide the partial-length correlator output to the comparator.

23. The system of claim 22 further comprising:

a first pseudo-noise sequence generator coupled with the correlator and with the controller to generate a first pseudo-noise sequence; and a second pseudo-noise sequence generator coupled with the correlator and with the controller to generate a second pseudo-noise sequence.

24. The system of claim 23 wherein:

the first pseudo-noise sequence is an in-phase pseudo-noise sequence; and the second pseudo-noise sequence is a quadrature-phase pseudo-noise sequence.

25. The system of claim 24 wherein the controller causes the first pseudo-noise sequence generator to generate varying timings of the first pseudo-noise sequence and causes the second pseudo-noise sequence generator to generate varying timings of the second pseudo-noise sequence.

26. A machine-readable medium having machine-executable instructions to cause an initial acquisition system to perform a method comprising:

performing a sort operation of a plurality of full-length correlator outputs;

updating the adaptive threshold; and comparing a partial-length correlator output with the adaptive threshold.

27. The machine-readable medium of claim 26 wherein the machine-executable instructions cause the initial acquisition system to perform a method further comprising using results of the sort operation to update the adaptive threshold.

28. The machine-readable medium of claim 26 wherein the machine-executable instructions cause the initial acquisition system to perform a method further comprising:

selecting a full-length correlator output from the plurality of full-length correlator outputs; and multiplying the full-length correlator output selected from the plurality of full-length correlator outputs by a factor.

29. The machine-readable medium of claim 28 wherein the full-length correlator output selected from the plurality of full-length correlator outputs is the full-length correlator output having the smallest value.

30. The machine-readable medium of claim 28 wherein the factor is a number greater than zero and less than one.

31. The machine-readable medium of claim 28 wherein the factor equals 0.4.

* * * * *